(12) United States Patent
Looney et al.

(10) Patent No.: US 11,495,244 B2
(45) Date of Patent: Nov. 8, 2022

(54) VOICE MODIFICATION DETECTION USING PHYSICAL MODELS OF SPEECH PRODUCTION

(71) Applicant: PINDROP SECURITY, INC., Atlanta, GA (US)

(72) Inventors: David Looney, London (GB); Nikolay D. Gaubitch, London (GB)

(73) Assignee: PINDROP SECURITY, INC., Atlanta, GA (US)

( * ) Notice: Subject to any disclaimer, the term of this patent is extended or adjusted under 35 U.S.C. 154(b) by 834 days.

(21) Appl. No.: 16/375,785

(22) Filed: Apr. 4, 2019

(65) Prior Publication Data

US 2019/0311730 A1   Oct. 10, 2019

Related U.S. Application Data (60) Provisional application No. 62/652,539, filed on Apr. 4, 2018.

(51) Int. Cl.
*G10L 25/00* (2013.01)
*G10L 25/51* (2013.01)
(Continued)

(52) U.S. Cl.
CPC ............ *G10L 25/51* (2013.01); *G10L 15/063* (2013.01); *G10L 15/22* (2013.01); *G10L 25/90* (2013.01); *H04M 3/436* (2013.01)

(58) Field of Classification Search
CPC .......... G06N 20/00; G06N 3/08; G10L 15/22; G10L 17/00; G10L 15/30; G10L 13/00;
(Continued)

(56) References Cited

U.S. PATENT DOCUMENTS

| 6,006,188 A | 12/1999 | Bogdashevsky et al. |
| 6,256,609 B1 * | 7/2001 | Byrnes ............... G10L 19/02 704/219 |

(Continued)

FOREIGN PATENT DOCUMENTS

WO    2011083362 A1    7/2011

OTHER PUBLICATIONS

Vaquero, C., & Rodriguez, P. (2015). On the need of template protection for voice authentication. In Sixteenth Annual Conference of the International Speech Communication Association. (Year: 2015).*

(Continued)

*Primary Examiner* — Edgar X Guerra-Erazo
(74) *Attorney, Agent, or Firm* — Foley & Lardner LLP (57) ABSTRACT

A computer may train a single-class machine learning using normal speech recordings. The machine learning model or any other model may estimate the normal range of parameters of a physical speech production model based on the normal speech recordings. For example, the computer may use a source-filter model of speech production, where voiced speech is represented by a pulse train and unvoiced speech by a random noise and a combination of the pulse train and the random noise is passed through an auto-regressive filter that emulates the human vocal tract. The computer leverages the fact that intentional modification of human voice introduces errors to source-filter model or any other physical model of speech production. The computer may identify anomalies in the physical model to generate a voice modification score for an audio signal. The voice modification score may indicate a degree of abnormality of human voice in the audio signal.

18 Claims, 6 Drawing Sheets

(51) Int. Cl.
- *G10L 25/90* (2013.01)
- *G10L 15/06* (2013.01)
- *G10L 15/22* (2006.01)
- *H04M 3/436* (2006.01)

(58) Field of Classification Search
CPC ......... G10L 17/04; G10L 17/02; G10L 17/24; G10L 17/22; G10L 17/26; G10L 21/003; G10L 21/013; G10L 2021/0135; G10L 21/0272; G10L 21/028; G10L 21/057; G10L 25/00; G10L 25/03; G10L 25/12; G10L 25/15; G10L 25/24; G10L 25/21; G10L 25/18; G10L 25/30; G10L 25/27; G10L 25/48; G10L 25/51; G10L 25/60; G10L 25/69; G10L 25/75; G10L 2025/783; G10L 2025/786; G10L 25/87; G10L 25/90; G10L 2025/906; G10L 2025/932; G10L 2025/935; G10L 2025/937

See application file for complete search history.

(56) References Cited

U.S. PATENT DOCUMENTS

| | | | |
|---|---|---|---|
| 8,682,650 B2 | 3/2014 | Gray et al. | |
| 9,372,976 B2 | 6/2016 | Bukai | |
| 9,786,275 B2 | 10/2017 | Coifman et al. | |
| 9,786,300 B2 | 10/2017 | Chan et al. | |
| 2001/0056349 A1* | 12/2001 | St. John | G07C 9/37 704/270 |
| 2002/0002460 A1 | 1/2002 | Pertrushin | |
| 2002/0010587 A1* | 1/2002 | Pertrushin | G10L 17/26 704/275 |
| 2010/0228656 A1 | 9/2010 | Wasserblat et al. | |
| 2013/0226569 A1 | 8/2013 | Chandra et al. | |
| 2014/0214676 A1 | 7/2014 | Bukai | |
| 2015/0142446 A1 | 5/2015 | Gopinathan et al. | |
| 2018/0146370 A1* | 5/2018 | Krishnaswamy | G10L 19/018 |

OTHER PUBLICATIONS

Srivastava, S., Nandi, P., Sahoo, G., & Chandra, M. (Feb. 2014). Formant based linear prediction coefficients for speaker identification. In 2014 International Conference on Signal Processing and Integrated Networks (SPIN) (pp. 685-688). IEEE. (Year: 2014).*

Alegre, F., Amehraye, A., & Evans, N. (Sep. 2013). A one-class classification approach to generalised speaker verification spoofing countermeasures using local binary patterns. In 2013 IEEE Sixth International Conference on Biometrics: Theory, Applications and Systems (BTAS) (pp. 1-8). IEEE. (Year: 2013).*

Aurino, F., Folia, M., Gargiulo, F., Moscato, V., Picariello, A., & Sansone, C. (Sep. 2014). One-class SVM based approach for detecting anomalous audio events. In 2014 International Conference on Intelligent Networking and Collaborative Systems (pp. 145-151). IEEE. (Year: 2014).*

Zhou, Y., Gong, Y., Wang, J., Sun, J., Zhang, X., & Zhu, T. (Oct. 2010). Speaker verification based on SVDD. In 2010 3rd International Congress on Image and Signal Processing (vol. 7, pp. 3168-3172). IEEE. (Year: 2010).*

V. S. Baidwan and S. Gujral, "Comparative Analysis of Prosodic Features and Linear Predictive Coefficients for Speaker Recognition Using Machine Learning Technique," 2014 International Conference on Devices, Circuits and Communications (ICDCCom), 2014, pp. 1-8. (Year: 2014).*

S. Safavi, H. Gan, I. Mporas and R. Sotudeh, "Fraud Detection in Voice-Based Identity Authentication Applications and Services," 2016 IEEE 16th International Conference on Data Mining Workshops (ICDMW), 2016, pp. 1074-1081. (Year: 2016).*

Adiga, Nagaraj, Banriskhem K. Khonglah, and SR Mahadeva Prasanna. "Improved voicing decision using glottal activity features for statistical parametric speech synthesis." Digital Signal Processing 71 (2017): 131-143. (Year: 2017).*

E. Nemer, R. Goubran and S. Mahmoud, "Robust voice activity detection using higher-order statistics in the LPC residual domain," in IEEE Transactions on Speech and Audio Processing, vol. 9, No. 3, pp. 217-231, Mar. 2001 (Year: 2001).*

Zhizheng Wu et al., "Synthetic Speech Detection Using Temporal Modulation Feature", http://www.zhizheng.org/papers/CASS2013_synthetic_dection.pdf. Publication date via https://ieeexplore.ieee.org/document/6639067, Date of Conference: May 26-31, 2013. date Added to IEEE Xplore: Oct. 21, 2013.

Philip K. Chan et al., "Modeling Multiple Time Series for Anomaly Detection", Retrieved from the Internet: https://www.researchgate.net/publication/220766749, Conference Paper—Jan. 2005.

Notification of Transmittal of the International Search Report and the Written Opinion of the International Searching Authority dated Jul. 9, 2019, issued in corresponding International Application No. PCT/US2019/025893, 12 pages.

* cited by examiner

VOICE MODIFICATION DETECTION USING PHYSICAL MODELS OF SPEECH PRODUCTION

CROSS-REFERENCE TO RELATED APPLICATIONS

This application claims priority to U.S. Provisional Application No. 62/652,539, filed Apr. 4, 2018, which is hereby incorporated by reference in its entirety.

TECHNICAL FIELD

This application relates generally to telephone security and more specifically to detecting voice modifications on a phone call audio.

BACKGROUND

Intentional voice modification is often used for malicious purposes by fraudsters to disguise their identity or to impersonate a legitimate user's voice. For example, fraudsters may change their voice pitch. Fraudsters may also use software tools to change the pitch, prosody, and tempo of their voice in real-time. Fraudsters may make these changes to their voices to disguise their identities in an attempt to trick a fraud detection system built on identifying known fraudster voices. Fraudsters may also make these changes to their voices to fraudulently emulate attributes of a potential victim. For example, a male fraudster may change his voice to sound like an elderly woman. By these changes to the voices, fraudsters may attempt to broadly match a profile (e.g., gender, age) of a potential victim. According to an estimate, ten percent of all fraud over the phone involves some form of voice modification.

Conventional technology to detect voice modification has several technical shortcomings. For instance, many of the conventional voice modification detection systems depend on multi-class machine learning stages that requires a large number of samples for normal (unmodified) and modified speech. A major technical shortcoming of such multi-class approach is its reliance on modified speech samples for training. As there are a plethora of methods for modifying and synthesizing speech, the ability of a multi-class approach to generalize is severely constrained. Therefore, a multi-class approach may fail to detect samples generated using modification methods different from those used to create the training samples. While a single-class tool has been previously proposed, the tool relies upon a combination of features that do not have a direct link to the physics of speech-production. This makes single-class approach critically reliant on a training stage involving a large number of normal speech recordings.

Therefore conventional voice modification detection technology is inefficient requiring a large number of training samples or not generalize for newer forms of voice modification techniques.

SUMMARY

What is therefore desired are systems and methods that may detect human voice modification without the need of training that gives examples of modified speech. What is further desired are the systems and methods that may utilize physical models of human speech production to detect human voice modification.

Embodiments disclosed herein attempt to solve the aforementioned technical problems and may provide other benefits as well. An illustrative computer may train a single-class machine learning using normal speech recordings as training samples. The machine learning model or any other model may estimate the normal range of parameters of a physical speech production model based on the normal speech recordings. As a non-limiting example, the computer may use a source-filter model of speech production. In the source-filter model, voiced speech (e.g., vowels) is represented by a pulse train and unvoiced speech (e.g., consonants and plosives) by a random noise and a combination of the pulse train and the random noise is passed through an auto-regressive filter that emulates human vocal tract. The computer leverages the fact that intentional modification of human voice introduces errors to source-filter model or any other physical model of normal speech production. The computer may identify anomalies in the physical model to generate a voice modification score for an audio signal. The voice modification score may indicate a degree of abnormality of human voice in the audio signal. A fraud-detection module or a computer may then utilize the voice modification score to indicate fraudulent behavior.

In an embodiment, a computer-implemented method comprises segmenting, by the computer, an audio signal from an incoming phone call to a plurality of audio frames; extracting, by the computer, a pitch parameter, a set of formant parameters, and a residual parameter for an audio frame of the plurality of audio frames based on a source-filter model; generating, by the computer, a pitch parameter statistic based upon the pitch parameter of the audio frame and respective pitch parameters of other audio frames of the plurality of audio frames; generating, by the computer, formant parameters statistics based upon the set of formant parameters for the audio frame and respective sets of formant parameters of other audio frames of the plurality of audio frames; generating, by the computer, a residual parameter statistic based upon the residual parameter of the audio frame and respective residual parameters of the other audio frames of the plurality of audio frames; calculating, by the computer, a voice modification score for the audio signal based upon comparing the pitch parameter statistic with a normal human speech pitch parameter statistic, comparing the formant parameters statistics with corresponding normal human speech formant parameter statistics, and comparing the residual parameter statistic with a normal human speech residual parameter statistic, the voice modification score indicating probability of the audio signal containing a modified human speech; and determining, by the computer, whether the incoming phone call is fraudulent based upon the voice modification score.

In another embodiment, a system comprises a non-transitory storage medium storing a plurality of computer program instructions; a processor electrically coupled to the non-transitory storage medium and configured to execute the plurality of computer program instructions to: segment an audio signal from an incoming phone call to a plurality of audio frames; extract a pitch parameter, a set of formant parameters, and a residual parameter for an audio frame of the plurality of audio frames based on a source-filter model; generate a pitch parameter statistic based upon the pitch parameter of the audio frame and respective pitch parameters of other audio frames of the plurality of audio frames; generate formant parameters statistics based upon the set of formant parameters for the audio frame and respective sets of formant parameters of other audio frames of the plurality of audio frames; generate a residual parameter statistic based upon the residual parameter of the audio frame and respective residual parameters of the other audio frames of the plurality of the audio frames; calculate a voice modification score for the audio signal based upon comparing the pitch parameter statistic with a normal human speech pitch parameter statistic and comparing the formant parameters statistics with corresponding normal human speech formant parameter statistics, and comparing the residual parameter statistic with a normal human speech residual parameter statistic, the voice modification score indicating probability of the audio signal containing a modified human speech; and determine whether the incoming phone call is fraudulent based upon the voice modification score.

In yet another embodiment, a computer-implemented method comprises extracting, by a computer, frame level parameters from an audio signal of an incoming phone call based upon a physical model of human speech; generating, by the computer, parameter statistics for the audio signal from the frame level parameters; executing, by the computer, a single-class machine learning model trained on normal human speech recordings on the parameter statistics to generate a voice modification score; and determining, by the computer, whether the incoming phone call is fraudulent based upon the voice modification score.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein describe systems and methods that utilize a physical model of human speech production for voice anomaly detection. An illustrative computer may extract speech production parameters based upon the physical model of speech production from training samples of a normal human speech. The computer may train a single-class machine learning model using the speech production parameters to characterize the distributions and the relationships between the speech production parameters for normal human speech. When the computer receives an audio signal to be processed (e.g., an audio signal not used for training the single-class machine learning model), the computer may extract speech production parameters from the audio signal and execute the machine learning model on the extracted speech production parameters. The machine learning model may compare the properties (e.g., distributions and relationships) of the speech production parameters of the received audio signal with the properties of the speech production parameters of normal human speech used to train the machine learning model. Using the machine learning model, the computer may generate a score between 0 and 1 indicating a probability of the audio signal containing a modified voice. It should however be understood that the use of the machine learning model is merely illustrative and other statistical models for characterizing the normal voice parameters should also be considered within the scope of this disclosure. As a non-limiting example of a physical model of human speech production, the computer may use a source-filter model.

A source-filter model includes a pulse train for voiced speech and white random noise for unvoiced speech. The pulse train may emulate the sound generated by the vibration of the vocal cord within the glottis. The pulse train may have a fundamental frequency (or a pitch F0). The white random noise may emulate the manipulation of airflow within the vocal tract or the glottis to generate plosives and consonants. To emulate the vocal tract (e.g., throat, mouth, and nose cavity), the source-filter model may use a linear prediction coding (LPC) filter. From the LPC filter, one or more formant parameters (e.g., F1, F2, F3, F4) may be extracted. The formant parameters may correspond to the peak frequencies of the LPC filter in the frequency domain. When a combination of the pulse train and the white random noise is fed through the LPC filter, human speech may be generated.

In an illustrative embodiment, the computer may extract frame level source-filter parameters from a received audio signal. The audio signal may be from an incoming phone call to a call center or an individual user. For an audio frame containing human voice, the computer may extract a pitch (F0). The computer may further extract coefficients for an LPC filter that may be used to generate the human voice in the audio frame. Based on the LPC coefficients, the computer may extract the formants and an optimal LPC model order for the audio frame. The computer may further apply an inverse LPC filter to the voice in the audio frame to generate LPC residual parameters such as glottal closure instances (GCIs) and glottal opening instances (GOIs). The computer may further generate other LPC residual parameters that may model the glottal activity. Non-limiting examples of the other LPC residual parameters that may model the glottal activity may include how long the glottis was open and/or how the glottis was closed. Another non-limiting example of the LPC residual parameters includes residual kurtosis. By executing these steps, the computer may estimate an LPC filter for an audio frame and remove the effects of vocal tract from the speech in the audio frame via inverse filtering such that the vocal tract signals and the glottal excitation signals are separated.

Using the frame level parameters, the computer may generate parameter statistics for a plurality of audio frames. In some embodiments, the computer may generate the parameter statistics for all the audio frame in the audio signal. In other embodiments, the computer may generate parameter statistics for a superframe that may contain a portion of the audio frames of the audio signals. For example, if the computer selects an audio frame in the order of 20-30 milliseconds, the superframe may be in the order of 2-10 seconds. The parameter statistics may include, for example, average parameter values across the audio frames and consistency of the parameter values.

The computer may then compare the generated parameter statistics with normal parameter statistics to generate a voice modification score. The voice modification score may be between 0 and 1 with higher voice modification score corresponding to a higher likelihood that the voice has been modified. The voice modification score may be based upon several anomaly scores corresponding to the several parameter statistics. For example, the computer may generate a first anomaly score based on comparing an average pitch parameter statistic generated from the multiple audio frames with an average pitch parameter statistic of the normal speech recordings. Similarly, the computer may generate a second anomaly score based upon comparing a formant statistic generated from the multiple audio frames with a formant statistic of the normal speech recordings. The computer may generate a third anomaly score based upon comparing a residual parameter statistic (e.g., residual kurtosis consistency) generated from the multiple audio frames with a residual parameter statistic of the normal speech recordings. The computer may then combine the first, the second, and the third anomaly scores to generate the voice modification score.

In some embodiments, the computer may use the voice modification score as a part of a larger fraud-detection software suite. The computer may utilize the voice modification score in association with other factors such as carrier signaling information to indicate whether an incoming call is fraudulent. In other embodiments, the computer may present the voice modification score to be displayed on a monitor in a call center or on a screen of a mobile phone of the individual user. It should however be understood that these utilizations of the voice modification scores are merely illustrative and other forms of the utilization of the voice modification score should also be considered to be within the scope of this disclosure.

Figure 1:
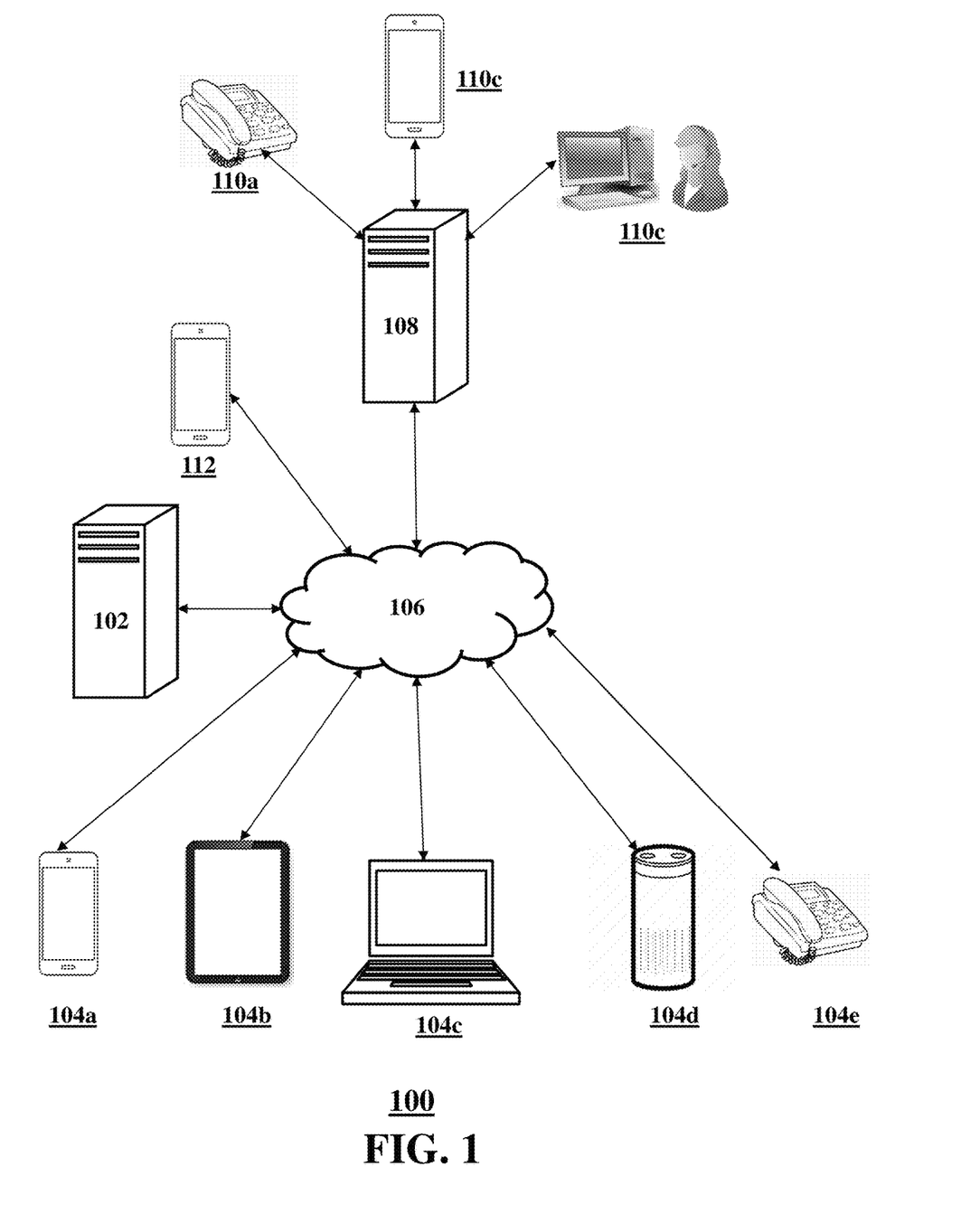
FIG. 1 shows an illustrative network environment for voice modification detection, according to an embodiment.

FIG. 1 shows an illustrative network environment 100 for voice modification detection, according to an embodiment. As shown, the illustrative network environment 100 may comprise an fraud-detection server 102, caller devices 104a-104e (collectively or commonly referred to as 104), a network 106, a call center server 108, call center terminal devices 110a, 110b (collectively or commonly referred to as 110), and a standalone callee device 112. It should be understood the network environment 100 is merely illustrative and network environments with additional, alternate, and fewer number of components should be considered within the scope of this disclosure.

The fraud-detection server 102 may be any kind of computing devices containing computer program instructions to perform the voice modification detection functions described herein. Non-limiting examples of the fraud-detection server 102 include a server computer, a laptop computer, a tablet computer, and a smartphone. The fraud-detection server 102 may be logically and physically organized within the same or different devices or structures, and may be distributed across any number of physical structures and locations (e.g., cabinets, rooms, buildings, cities). The fraud-detection server 102 may comprise a processor to execute the computer program instructions, a memory to store results generated by the processor, and a storage to store the computer program instructions and one or more databases.

Although the fraud-detection server 102 is shown as a separate component connected to the call center server 108 through the network 106, it should be understood that the functionality of the fraud-detection server 108 may be provided by the call center server 108. The call center server 108 may have software modules that for voice modification detection without requiring a separate fraud-detection server 102. Additionally or alternatively, the software modules for the functionality provided by the fraud-detection server 102 may be installed on the call center terminal devices 110. It should therefore generally be understood that the voice modification detection functionality may be provided by software modules installed in any device or any combination of devices within the network environment 100.

The caller devices 104 may include any kind of computing devices configured to make/receive phone calls. These phone calls may be through telephone exchanges or over internet protocol. Non-limiting examples of caller devices 104 include a smartphone 104a, a tablet computer 104b, a laptop computer 104c, a voice enabled personal assistant 104d (also referred to as a smart speaker), and a wired telephone 104e. It should be understood that the caller devices 104 shown in FIG. 1 are merely illustrative and other caller devices such as smartwatches and desktop computers should be considered to be within the scope of this disclosure. A caller device 104 may include a processor configured to execute computer program instructions and a memory to store one or more results of the executions. The caller device 104 may include a storage for storing computer program instructions and one or more databases. The caller devices 104 may further have hardware and software to enable network functionalities to interact with the network 106.

The network 106 may include any type of network, including but not limited to, Local Area Network (LAN), Wireless Local Area Network (WLAN), Metropolitan Area Network (MAN), Wide Area Network (WAN), cellular network, any type of wired/wireless telephone network, and the Internet. The communication over the network 106 may be performed in accordance with various communication protocols, such as Transmission Control Protocol and Internet Protocol (TCP/IP), User Datagram Protocol (UDP), and IEEE communication protocols. For example, the network 106 may include components for wired/wireless telephony. It should be understood that the FIG. 1 shows only one network 106 for brevity, the network environment 100 may include multiple networks based on a plurality of communication protocols.

The call center server 108 may be any kind of computing device for receiving calls for an enterprise (e.g., a bank).

Non-limiting examples of the call center server 108 include a server computer, a laptop computer, a tablet computer, and a smartphone. The call center server 108 may be an IVR server providing interactive and automated responses to customer calls arising from the caller devices 104. The call center server 108 may be connected to call center terminal devices 110. For example, the call center terminal devices 110 may include a wired telephone 110a, a wireless telephone 110c, and an agent computer 110c. It should be understood that the shown configuration of the call center server 108 and the call center terminal devices 110 is merely illustrative and other configurations should be considered to be within the scope of this disclosure. For example, the call center terminal devices 110 may receive a phone call without going through the call center server 108. The software modules for the functionality of the call center server 108 may be installed directly on the call center terminal devices 110.

The standalone callee device 112 may be any kind of electronic device capable of receiving a phone call. The standalone callee device 112 may be a personal device utilizing the voice modification detection functionality described herein and may not be associated with an enterprise or a call center. For example, a portion of the voice modification detection functionality may be executed by an application (e.g., a smartphone app) on the standalone callee device 112. The application may communicate with the fraud-detection server 102 through the network 106 for the voice modification detection functionality.

In an illustrative operation, the fraud-detection server 102 may receive an audio signal of a phone call from a caller device 104. The fraud-detection server 102 may calculate frame level parameters of the audio signal based on a physical model of human speech production. From the frame level parameters, the fraud-detection server 102 may generate parameter statistics for a plurality of audio frames. The fraud-detection server 102 may compare the generated parameter statistics with parameter statistics associated with normal human speech recordings to generate a voice modification score. The fraud-detection server 102 may then determine whether the phone call is fraudulent based upon the voice modification score. It should be understood that the fraud-detection server may utilize the voice modification score in addition to other factors to determine whether the phone call is fraudulent.

Figure 2:
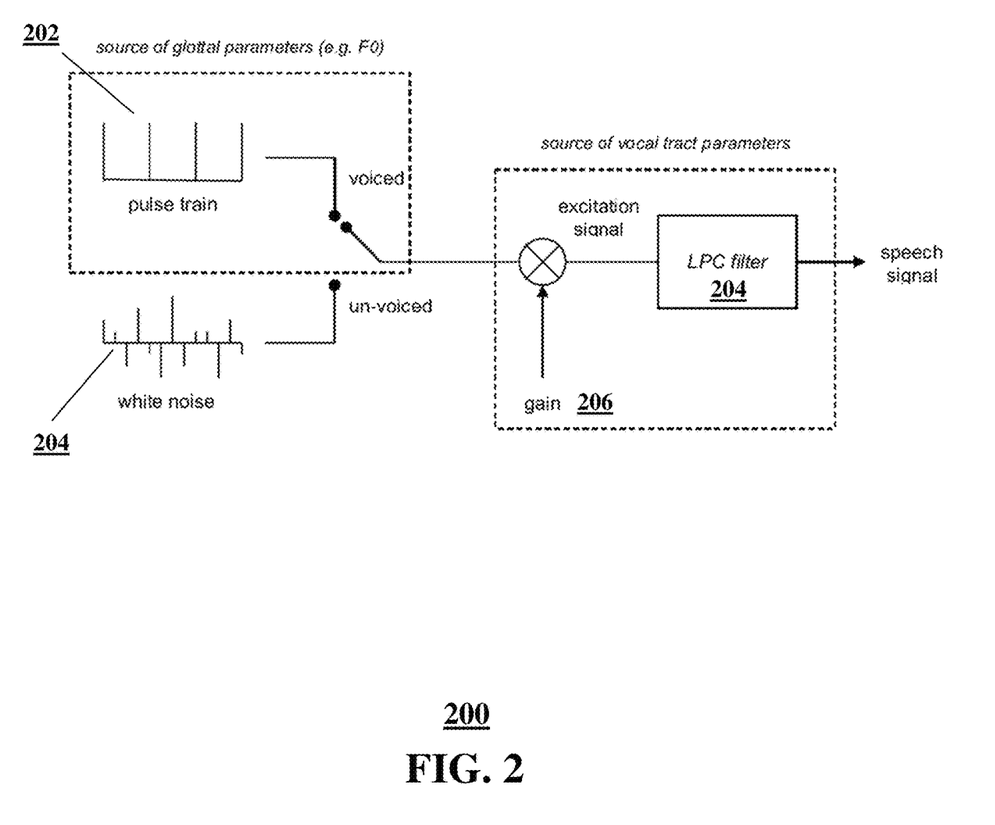
FIG. 2 shows an illustrative source-filter model of human speech production, according to an embodiment.

FIG. 2 shows an illustrative source-filter model 200, according to an embodiment. A computer may use the source-filter model 200 to generate or model human speech. The source-filter model 200 may also be referred to as linear prediction coding (LPC). It should be understood that the source-filter model 200 is an illustrative physical model for human speech production and should not be considered limiting. Embodiments disclosed here may use other physical models of human speech production.

As shown, the source-filter model 200 may include a pulse train 202 that may be provide a voiced portion of the speech. The pulse train 202, shown here in time-domain, may represent voiced speech (e.g., vowels) of human sound based on glottal activity (i.e., the movement of vocal chords). The pulse train may include a fundamental frequency (e.g., pitch parameter F0) and the corresponding harmonics. For unvoiced speech (e.g., consonants and plosives), the source-filter model 200 may use a white noise 204, also shown in time-domain in FIG. 2. The pulse train 202 and the white noise 204 may therefore represent the source portion of the source-filter model 200 and may provide an excitation signal for the filter portion of the source-filter model 200. In some embodiments, the excitation signal may be amplified by a gain factor 206. The filter portion of the source-filter model 200 may include an LPC filter 204 that emulates the effect of human vocal tract (e.g., throat, mouth) on the combination of voiced speech and unvoiced speech generated at the source portion. The filter portion of the source-filter model may provide the formant parameters (e.g., F1-F4).

Figure 3:
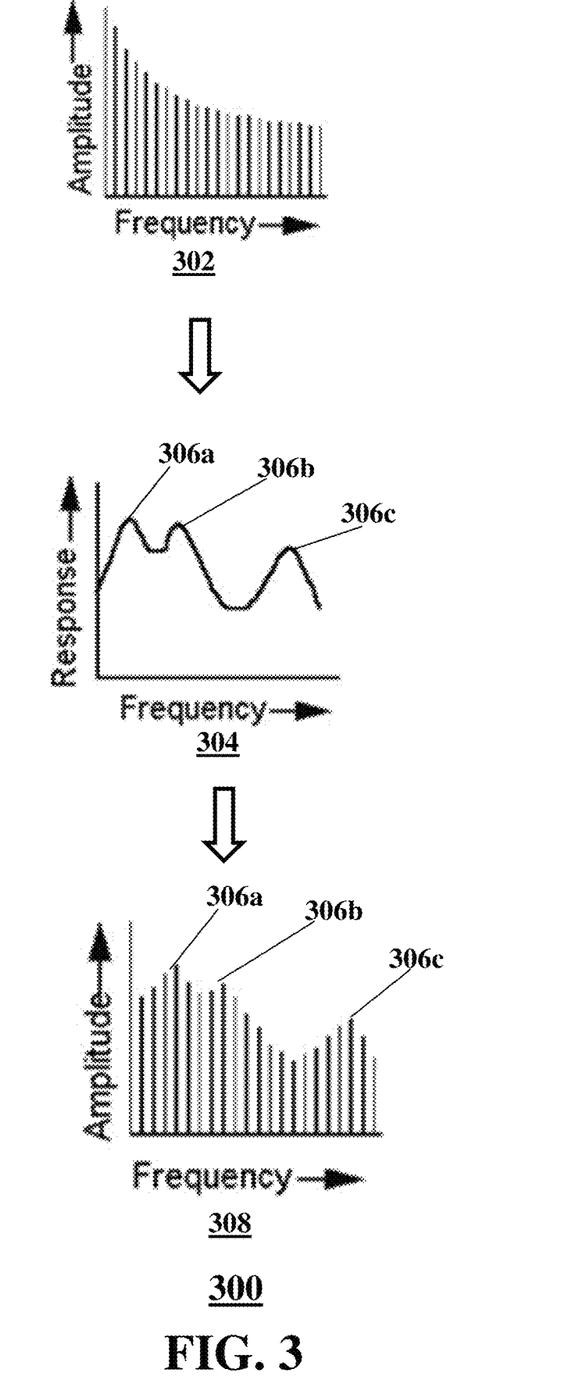
FIG. 3 shows an illustrative process of human speech generation based on a source-filter model, according to an embodiment.

FIG. 3 shows an illustrative process diagram 300 of human speech generation using a source-filter model, according to an embodiment. At the beginning of the process 300, the movement of vocal cords may generate various frequencies as shown in the graph 302. For example, the frequency spectrum shown in the graph 302 may be the frequencies in a pulse train (in time-domain) generated by vocal chords. The frequency spectrum shown in graph 302 may be modified by a frequency response of human vocal tract as shown in graph 304. The frequency response of the human vocal tract may be based upon a plurality of factors such as position of the tongue and the orientation of lips. The peak frequency values of the frequency response of the human vocal tract are referred to as formants. The illustrative formants are shown as 306a, 306b, 306c. For example, formant 306a may be parameter F1, formant 306b may be parameter F2, and formant 306c may be parameter F3.

Graph 308 shows the modification imparted by the human vocal tract to the frequency spectrum (shown in graph 302) generated by the vocal cords at the end of the human speech generation process. In particular, the amplitude of a portion of the frequency spectrum of graph 302 may be based upon the frequency response of graph 304 thereby generating human voice modeled as shown in the graph 308. As with graph 304, the graph 308 may have formant 306a corresponding to parameter F1, formant 306b corresponding to parameter F2, and formant 306c corresponding to parameter F3.

Figure 4:
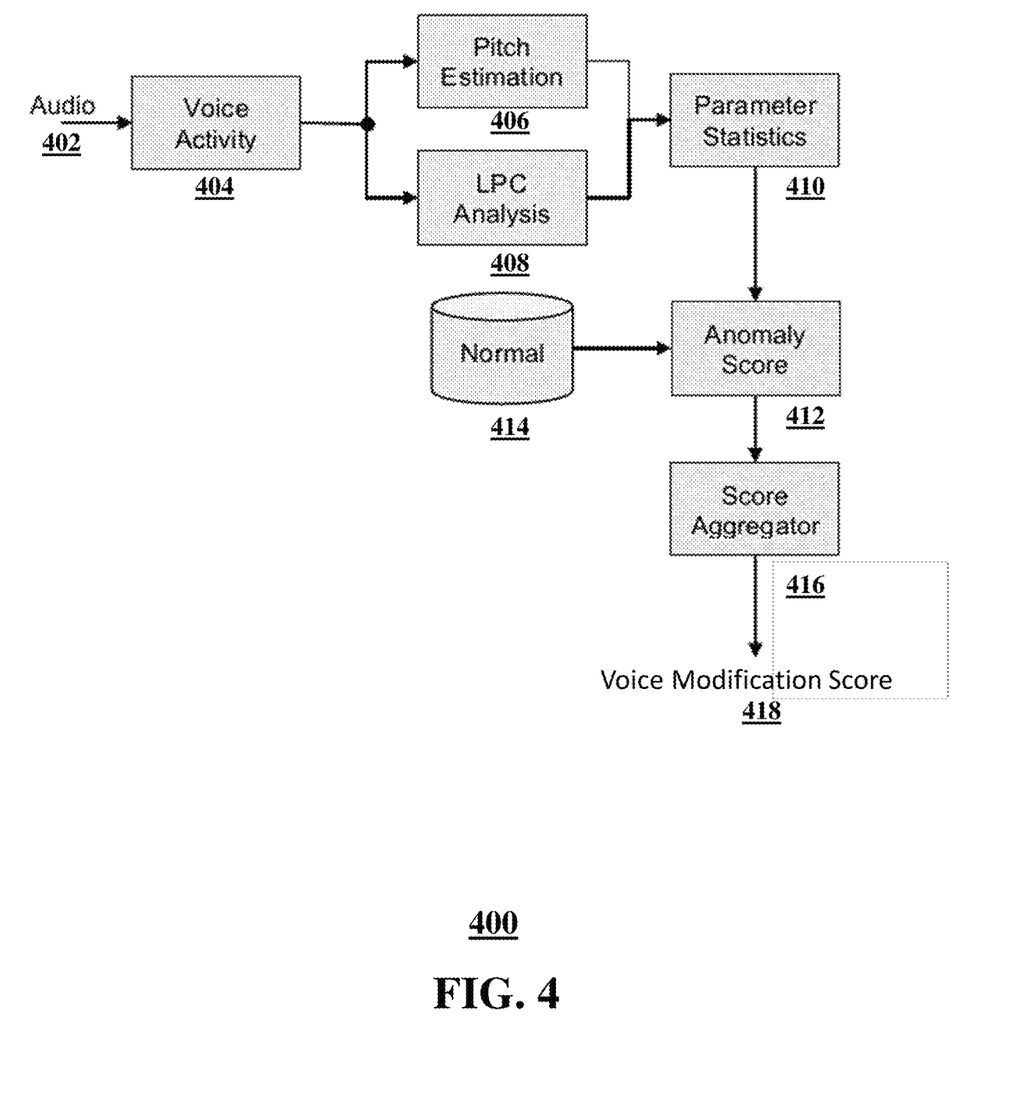
FIG. 4 shows a process diagram of an illustrative method of voice modification detection, according to an embodiment.

FIG. 4 shows a process diagram of an illustrative method 400 of voice modification detection, according to an embodiment. It should be understood that the process steps shown in FIG. 4 and the associated components are shown are merely illustrative and alternative, additional, and fewer number of steps and/or components should also be considered within the scope of this disclosure. Although multiple computers may implement the process steps, the following describes, for brevity, a single computer implementing the process steps.

The method 400 may begin when the computer receives an audio signal 402. The audio signal 402 may be from an incoming phone call. The incoming phone call may be to a call center or to an individual user's phone. For the embodiments where the incoming phone call is to a call center, the computer may (executing the method steps) be a call center server executing an fraud-detection application or an fraud-detection server connected to the call center server. For the embodiments where the incoming phone call is to an individual user's phone, the computer may be a smartphone executing a fraud-detection application or a fraud-detection software module.

The computer may execute a voice activity detection step 404 to identify the portions of the audio signal 402 that contain human voiced speech. In particular, the computer may utilize a voice activity detector (VAD) to identify the portions of the audio signal 402 that contain human voiced speech. The computer may then segment the portions of the audio signal 402 containing human voiced speech into audio frames.

For each audio frame, the computer may execute a pitch estimation step 406 and an LPC analysis step 408. At the pitch estimation step 406, the computer may extract the pitch (parameter F0) from the audio frame. The pitch may be based on the physical movement of vocal cords within the glottis. For example, pitch may be fundamental frequency generated by the vocal cords of a speaker.

At the LPC analysis step 408, the computer may extract LPC coefficients from the audio frame. As an illustration, the computer may use Levinson Durbin algorithm to extract the LPC coefficients. From the LPC coefficients, the computer may determine formants (e.g., parameters F1-F4) from the audio frame. Specific ranges of formants may characterize different sounds or phonemes. Furthermore, the computer may determine optimal LPC model order for calculating the LPC coefficients. The LPC model order may correspond to the length of human vocal tract. To extract the LPC residual parameters (also referred to as residual parameters), the computer may apply an inverse LPC filter to the audio frame based upon the extracted LPC coefficients. A non-limiting example of an LPC residual parameter may be residual kurtosis—the kurtosis value of prediction residuals for the audio frame. The computer may further extract one or more models of glottal activity utilizing the LPC residuals. Glottal activity may include how long the glottis opens and closes or any other parameter related to the airflow through the glottis. The glottal activity may also include other parameters within one glottal cycle. The computer may also extract parameters such as glottal closure instances (GCIs) and glottal opening instances (GOIs).

In a parameter statistics generation step 410, the computer may generate parameter statistics based upon the parameters extracted from multiple audio frames. The multiple audio frames as discussed herein may encompass the entire speech portion of the audio signal 402 or a superframe of a predetermined duration (e.g., 2-10 seconds). The parameter statistics may include average parameter values. For example, the parameter statics may include the average values of the pitch (e.g., average value of parameter F0) and formants (e.g., respective average values of parameters F1, F2, F3, F4) across the multiple audio frames.

The computer may generate a parameter statistic of pitch consistency. The computer may track the fluctuation of the pitch (e.g., parameter F0) across the multiple audio frames. For example, the computer may calculate the deviations of the pitch from the average pitch and generate a pitch consistency value based upon the calculated deviations. As an illustration, the computer may use standard deviation to generate the pitch consistency. As another parameter statistic, the computer may calculate LPC formant and inter-formant consistency. The LPC formant consistency may measure the changes in the one or more formants across audio frames. For example, the LPC formant consistency may track how a formant (e.g., F1) changes across the multiple audio frames. The inter-formant consistency may measure the distribution of inter-formant behavior across the multiple audio frames. For example, the inter-formant consistency may track the differences between two formants (e.g., F1 and F2) across the multiple audio frames. The computer may also generate a parameter statistic of residual kurtosis consistency.

The computer may also generate model order consistency statistic. The model order may refer to an LPC filter model order. A higher model order filter may have more filter parameters (also referred to as filter coefficients) compared to a lower model order filter. In a source-filter model, the model order of the filter may be based upon the size of a human vocal tract. The computer may track the filter order across the multiple audio frames to generate the model order consistency statistic. The computer may also track whether the extracted parameters adhere to an expected glottal model. The computer may also track the LPC residual consistency.

The computer may perform outlier-rejection for each of the considered parameters. That is, the computer may disregard parameter values for audio frames, within the audio signal 402 or a superframe, when calculating each of the parameter statistics. The disregarded values may include, for example, values that are assessed to be extreme owing to the presence of noise. The audio frames containing human voiced speech that are retained following the aforementioned outlier-rejection process may also be referred to as valid frames as they may contain human speech and not just noise.

The computer may execute the anomaly scoring step 412 to generate anomaly score for each parameter statistic generated in step 410. For example, for the average F0 statistic, the computer may compare the average F0 to a probability density based on normal speech parameters. The normal speech parameters may be stored in a database 414. In an illustrative embodiment, the anomaly score for the average F0 may be a function of p-value: the probability of observing a value as extreme as the average F0 value or a more extreme value. As described above, pitch (or parameter F0) may be linked to glottal closure frequency and is limited by physical movement of vocal cords within the glottis. The variation of pitch between different sounds may cause a particular prosody of a speaker. Pitch may also be dependent on the speaker and language. When voice (or speech) is intentionally modified—manually or through software—the pitch may deviate from the normal. For example, pitch of an intentionally modified voice may be very high, very low, or may have non-standard pitch variability. The anomaly score for the pitch statistic may indicate the degree of deviation of the pitch statistic from a normal pitch statistic.

As other examples of parameter statistics, voice source model statistics may model the glottal pulse. Glottal pulses may have defined structure with mathematical models to define such structure. When speech is modified, this structure may not be present or may not be accurate. The formant parameters and formant statistics may be linked to vocal tract configuration and the resonances associated with the vocal tract configuration. Ranges of formant values may characterize different sounds (phonemes). When a voice is modified, the modification may create anomalies in the formant frequencies, and the absolute and relative frequencies of the formant frequencies. LPC filter order may be linked to length of vocal tract. Modified voice may have optimal LPC filter order that may not correspond to a normal-sized vocal tract. Therefore, LPC residual structure in a normal voice may have well-defined peaks at glottal closure instants and noise in unvoiced speech. When the voice is modified, this structure is not often present. In some embodiments, the parameter statistics may not even be compatible with a physical model indicating a modification (or distortion) of the voice in the audio signal.

The computer may also calculate the anomaly score for a parameter statistic using frame-banded scoring. The number of valid frames may impact the anomaly score for the parameter statistic. For example, an anomalous parameter statistic calculated across a large number of audio frames may be considered a greater anomaly compared to the same parameter statistic calculated for a smaller number of audio frames. The computer may therefore calculate a parameter statistic for different frame-bands. For example, the computer may calculate a first parameter statistic for a first frame-band and a second parameter statistic for a second frame-band. The computer may then compare the first parametric statistic with a normal statistic store in the database 414 to generate a first anomaly score and compare the second parameter statistic with the normal statistic to generate the second anomaly score. The computer may then calculate the aggregated anomaly score for the parameter statistic by interpolating between the first anomaly score and the second anomaly score.

The computer may execute the score aggregation step 416 to generate a voice modification score 418 from the individual anomaly scores calculated in step 412. In particular, the computer may combine the individual anomaly scores for the individual parameters to generate a voice modification score between 0 and 1. A higher voice modification score may indicate more anomalous parameter statistics and therefore a greater likelihood that the voice has been intentionally modified.

For the aforementioned anomaly calculations, the computer may use a single-class machine learning model trained on normal speech model without requiring modified speech training data. However, it should not be understood that the examples of the aforementioned speech production parameters (e.g., F0, F1) should be considered limiting. The computer may extend the speech-production parameters using non-speech specific audio features that may include spectral features such as spectral slope and time-domain features or may use other non-speech specific audio features such as mel-frequency cepstral coefficients (MFCCs) and modulation domain descriptors.

Figure 5:
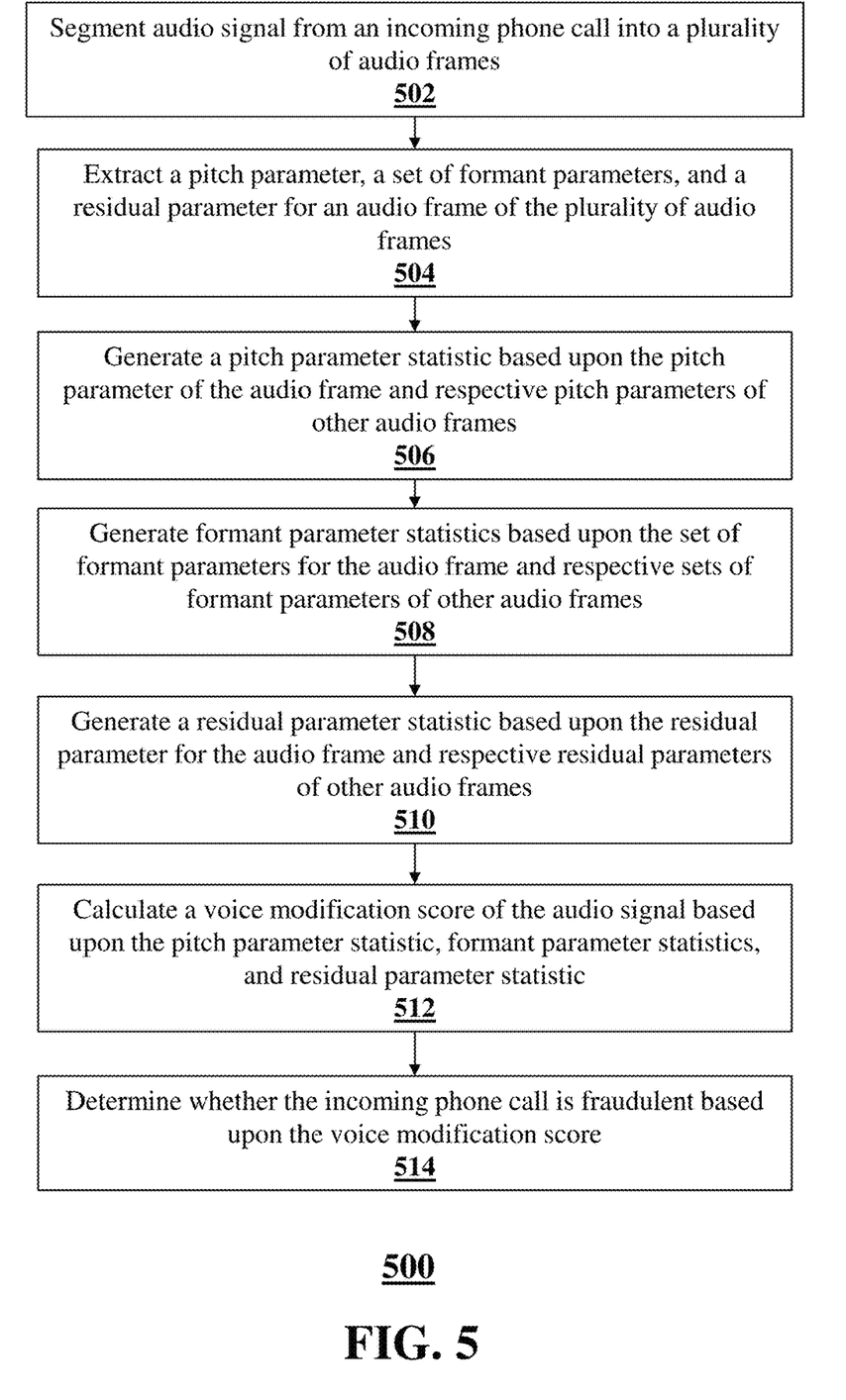
FIG. 5 shows a flow diagram of an illustrative method of voice modification detection, according to an embodiment.

FIG. 5 shows a flow diagram of an illustrative method 500 for identifying voice modification, according to an embodiment. It should be understood that the steps of the method 500 shown and described herein are merely illustrative and additional, alternative, or a fewer number steps should also be considered within the scope of this disclosure. Although multiple computing devices may execute the steps of the method 500, the following describes, for brevity, a single computer executing all the steps of the method 500.

The method 500 may begin at step 502 where the computer may segment an audio signal from an incoming phone call into a plurality of audio frames. Prior to segmenting the audio signal, the computer may utilize a voice activity detector to identify portions of the audio signal containing human voiced speech. The computer may then generate the audio frames by segmenting the portions the audio signal that contain the human voiced speech. Following an outlier rejection process, the audio frames containing human voiced speech may be referred to as valid frames as they contain human voiced speech and not just noise. The length of an audio frame may be in the order of milliseconds (e.g., 20-30 milliseconds). In one embodiment, plurality of audio frames as described herein may contain all voiced speech in the audio signal. In another embodiment, the plurality of audio frames may form a superframe. The superframe may contain a portion of the voiced activity in the audio signal. For example, a superframe may be 2 seconds to 10 seconds long.

At a next step 504, the computer may extract a pitch parameter, a set of formant parameters, and a residual parameter for an audio frame of the plurality of audio frames. The pitch parameter (F0) may correspond to the fundamental frequency of vibration of the vocal cords of the speaker generating the human speech in the audio signal. The formant parameters (e.g., F1, F2, F3, F4) may be based on the characteristics of the vocal tract of the speaker. The residual parameter may be a residual kurtosis of the prediction residuals for the audio frame.

At a next step 506, the computer may generate a pitch parameter statistic based upon the pitch parameter of the audio frame and respective pitch parameters of other audio frames of the plurality of audio frames. For example, the pitch parameter statistic may be the average pitch value of the plurality of the audio frames. As another example, the pitch parameter statistic may be the pitch consistency of the plurality of audio frames.

At a next step 508, the computer may generate formant parameter statistics based upon the set of formant parameters for the audio frame and respective sets of formant parameter of other audio frames of the plurality of audio frames. For example, the computer may generate average formant parameters such as an average F1 and an average F2. As another example, the computer may generate formant consistency statistics and inter-formant consistency statistics.

At a next step 510, the computer may generate a residual parameter statistic based upon the residual parameter for the audio frame and respective residual parameters of other audio frames. As an example, the computer may generate residual kurtosis consistency statistic from the corresponding residual kurtoses of the plurality of audio frames.

At a next step 512, the computer may calculate a voice modification score of the audio signal based upon the pitch parameter statistic, the format parameter statistics, and the residual parameter statistic. The voice modification score may be based upon individual anomaly scores. The computer may generate a first anomaly score based upon comparing the pitch parameter statistic with a normal parameter statistic. The computer may generate a second anomaly score based upon comparing the formant parameter statistics with normal formant parameter statistics. The computer may generate a third anomaly score based upon comparing the residual parameter statistic with a normal residual parameter statistic. For one or more of these comparisons, the computer may execute a single-class machine learning model trained on statistics for normal human voiced speech.

At a next step 514, the computer may determine whether the incoming phone call is fraudulent based upon the voice modification score. For example, the voice modification score may be a part of a larger fraud-detection suite that the computer may utilize to detect fraudulent calls. The computer may therefore use the voice modification score in association with other factors such as carrier signaling information to determine whether the incoming phone call is fraudulent.

In some embodiments, the computer may provide the voice modification score to a call center agent or any other call center system. For example, when a call center agent picks up a phone, the computer may display the voice modification score on a screen being used by the call center agent. Based on the voice modification score, the call center agent may make a determination as to how to engage with the person at the other end of the phone call. As another example, if the computer is a mobile phone, the computer may display the voice modification score on the screen of the mobile phone such that a callee may view the voice modification score. It should however be understood that these uses of the voice modification score are merely illustrative and other uses of the voice modification score are to be considered within the scope of this disclosure.

Figure 6:
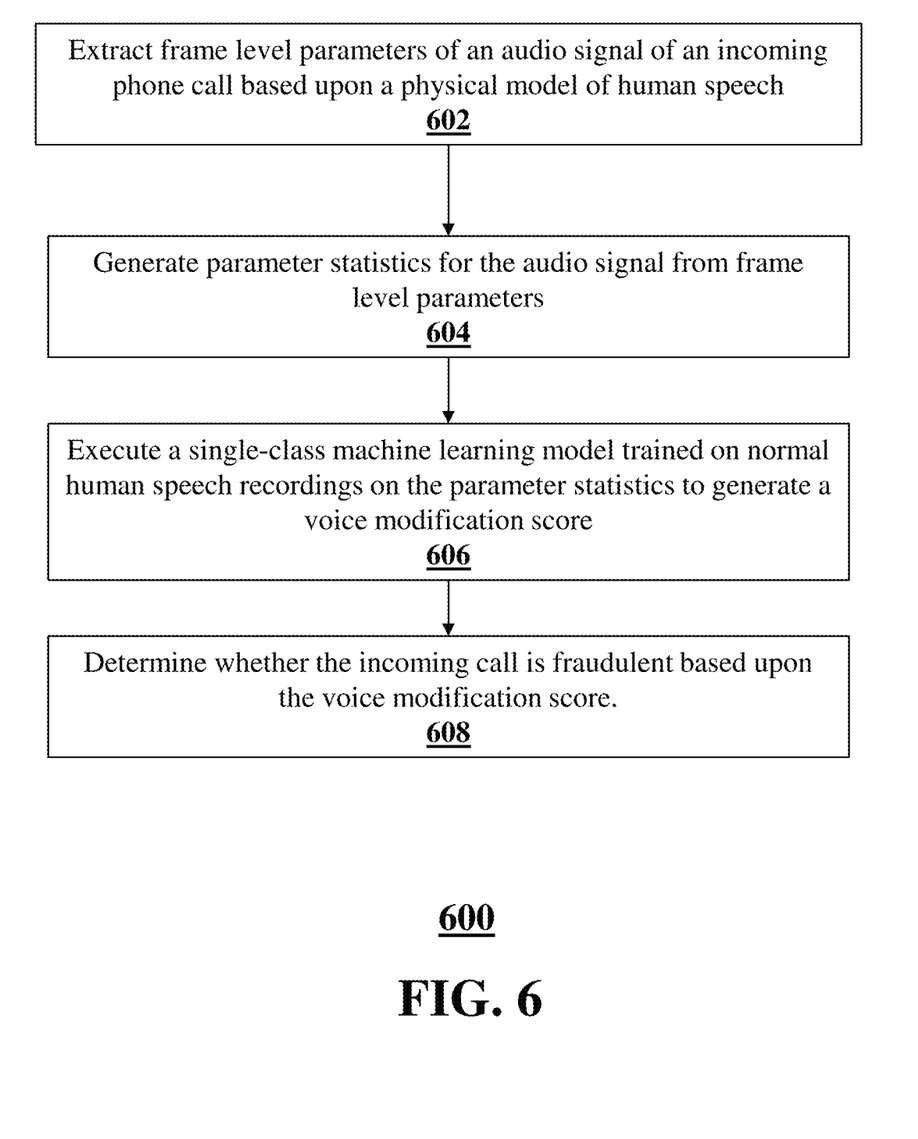
FIG. 6 shows a flow diagram of an illustrative method of voice modification detection, according to an embodiment.

FIG. 6 shows a flow diagram of an illustrative method 600 of detecting voice modification, according to an embodiment. It should be understood that the steps of the method 600 shown and described herein are merely illustrative and alternative, additional, and fewer number of steps should be considered within the scope of this disclosure. Although multiple computing devices may execute one or more steps of the method, the following describes, for brevity, a single computer executing all of the steps.

The method 600 may begin at step 602 where the computer may extract frame level parameters of an audio signal of an incoming phone call based upon a physical modal of human speech. The physical model of human speech may be a source-filter model and the frame level parameters may be based upon the source-filter model. The frame-level parameters for a source-filter model may include, for example, pitch of the human voice in an audio-frame, formants, and the LPC residuals. It should however be understood that the source-filter model for is merely illustrative and other physical models of human speech production or auditory models should also be considered within the scope of this disclosure.

At a next step 604, the computer may generate parameter statistics for the audio signal from frame level parameters. In some embodiments, the computer may generate the parameter statistics for the entire audio signal based on the frame level parameters of audio frames of the entire voiced portion of the audio signal. In other embodiments, the computer may generate the frame level statistics based upon a superframe. For example, if an audio frame is in the order of 20-30 milliseconds, the superframe may be in the order of 2-10 seconds. Some examples of the parameters statistics may include average pitch, formant, inter-formant consistency, and residual kurtosis consistency. It should however be understood that these parameter statistics are merely illustrative and other parameter statistics should also be considered within the scope of this disclosure.

At a next step 606, the computer may execute a single-class machine learning model trained on normal human speech recordings on the parameter statistics to generate a voice modification score. The machine learning model may generate separate anomaly scores for the different parameter statistics and combine the anomaly scores to generate the voice modification score. The voice modification score may be between 0 and 1 and indicate the degree of abnormality of human speech contained in the audio signal.

At a next step 608, the computer may determine whether the incoming call is fraudulent based upon the voice modification score. The voice modification score generation method 600 may be a part of a larger fraud-detection suite, and the computer may use the voice modification score in coordination with other factors to determine whether the incoming call is fraudulent.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A computer-implemented method comprising:
    segmenting, by the computer, an audio signal from an incoming phone call into a plurality of audio frames;
    extracting, by the computer, a pitch parameter, a set of formant parameters, and a residual parameter for an audio frame of the plurality of audio frames based on a source-filter model;
    generating, by the computer, a pitch parameter statistic based upon the pitch parameter of the audio frame and respective pitch parameters of other audio frames of the plurality of audio frames;
    generating, by the computer, formant parameters statistics based upon the set of formant parameters for the audio frame and respective sets of formant parameters of other audio frames of the plurality of audio frames;
    generating, by the computer, a residual parameter statistic based upon the residual parameter of the audio frame and respective residual parameters of the other audio frames of the plurality of audio frames;
    calculating, by the computer executing a machine-learning model on one or more parameter statistics, a voice modification score for the audio signal based upon comparing the pitch parameter statistic with a normal human speech pitch parameter statistic, comparing the formant parameters statistics with corresponding normal human speech formant parameter statistics, and comparing the residual parameter statistic with a normal human speech residual parameter statistic, the voice modification score indicating probability of the audio signal containing a modified human speech; and
    determining, by the computer, whether the incoming phone call is fraudulent based upon the voice modification score.

2. The computer-implemented method of claim 1, wherein the pitch parameter statistic includes at least one of an average pitch value and pitch consistency.

3. The computer-implemented method of claim 1, wherein the format parameters statistics include at least one of average formant values and inter-formant consistency.

4. The computer-implemented method of claim 1, wherein the residual parameter includes residual kurtosis and the residual parameter statistic includes residual kurtosis consistency.

5. The computer-implemented method of claim 1, wherein the residual parameter indicates at least one of glottal closure instances, glottal opening instances, and a model of glottal activity.

6. The computer-implemented method of claim 1, further comprising:
    extracting, by the computer, a linear predictive coding (LPC) model order parameter from the audio frame;
    generating, by the computer, an LPC model order statistic for the audio signal based upon the LPC model order parameter of the audio frame and respective model order parameters of the other audio frames; and
    calculating, by the computer, the voice modification score for the audio signal based upon comparing the LPC model order statistic with a normal human speech LPC model order statistic.

7. The computer-implemented method of claim 6, wherein the LPC model order statistic includes model order consistency.

8. The computer-implemented method of claim 1, wherein the machine learning model is a single-class model trained on normal speech recordings.

9. A system comprising:
    a non-transitory storage medium storing a plurality of computer program instructions;
    a processor electrically coupled to the non-transitory storage medium and configured to execute the plurality of computer program instructions to:
        segment an audio signal from an incoming phone call into a plurality of audio frames;
        extract a pitch parameter, a set of formant parameters, and a residual parameter for an audio frame of the plurality of audio frames based on a source-filter model;
        generate a pitch parameter statistic based upon the pitch parameter of the audio frame and respective pitch parameters of other audio frames of the plurality of audio frames;
        generate formant parameters statistics based upon the set of formant parameters for the audio frame and respective sets of formant parameters of other audio frames of the plurality of audio frames;
        generate a residual parameter statistic based upon the residual parameter of the audio frame and respective residual parameters of the other audio frames of the plurality of the audio frames;
        calculate, by executing a machine-learning model on one or more parameter statistics, a voice modification score for the audio signal based upon comparing the pitch parameter statistic with a normal human speech pitch parameter statistic, comparing the formant parameters statistics with corresponding normal human speech formant parameter statistics, and comparing the residual parameter statistic with a normal human speech residual parameter statistic, the voice modification score indicating probability of the audio signal containing a modified human speech; and determine whether the incoming phone call is fraudulent based upon the voice modification score.

10. The system of claim 9, wherein the pitch parameter statistic includes at least one of an average pitch value and pitch consistency.

11. The system of claim 9, wherein the format parameters statistics include at least one of average formant values and inter-formant consistency.

12. The system of claim 9, wherein the residual parameter includes residual kurtosis and the residual parameter statistic includes residual kurtosis consistency.

13. The system of claim 9, wherein the residual parameter indicates at least one of glottal closure instances, glottal opening instances, and a model of glottal activity.

14. The system of claim 9, wherein the processor is configured to further execute the computer program instructions to:

extract a linear predictive coding (LPC) model order parameter from the audio frame of the plurality of audio frames;

generate an LPC model order statistic for the audio signal based upon the LPC model order parameter of the audio frame and respective model order parameters of the other audio frames; and calculate the voice modification score for the audio signal based upon comparing the LPC model order statistic with a normal human speech LPC model order statistic.

15. The system of claim 14, wherein the LPC model order statistic includes model order consistency.

16. The system of claim 9, wherein the machine learning model is a single-class model trained on normal speech recordings.

17. A computer-implemented method comprising:

extracting, by a computer, frame level parameters from an audio signal of an incoming phone call based upon a physical model of human speech;

generating, by the computer, parameter statistics for the audio signal from the frame level parameters;

executing, by the computer, a single-class machine learning model trained on normal human speech recordings on the parameter statistics to generate a voice modification score based upon comparisons of the parameter statistics; and determining, by the computer, whether the incoming phone call is fraudulent based upon the voice modification score.

18. The computer-implemented method of claim 17, wherein the physical model is a source-filter model.

* * * * *